April 26, 1955
D. G. BOLTON
2,707,018
HEAT-SEALING APPARATUS
Filed Nov. 23, 1951
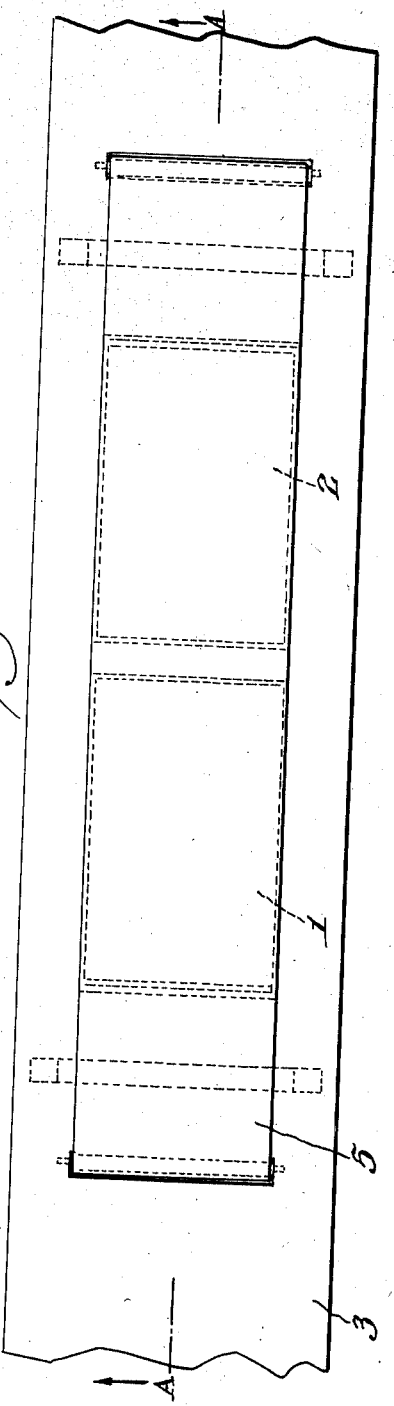
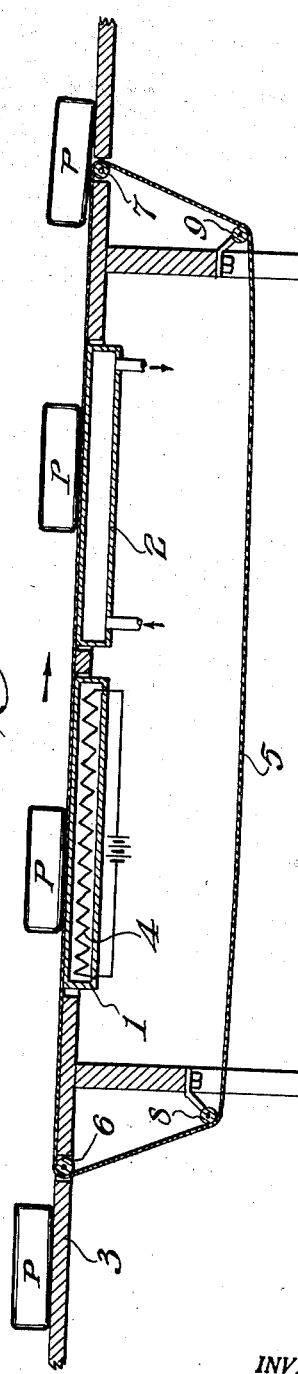
INVENTOR:
DUNCAN G. BOLTON
BY
ATTORNEY.

United States Patent Office 2,707,018
Patented Apr. 26, 1955

2,707,018

HEAT-SEALING APPARATUS

Duncan G. Bolton, Wilmington, Del., assignor to E. I. du Pont de Nemours & Company, Wilmington, Del., a corporation of Delaware Application November 23, 1951, Serial No. 257,796

3 Claims. (Cl. 154—42)

This invention relates to a process and apparatus for heat-sealing wrapping tissue of thermoplastic films, and, more particularly, to a process and apparatus for heat-sealing packages wrapped in thermoplastic films.

When heat-sealing polyethylene, rubber hydrochloride, vinylidene chloride, polyethylene terephthalate and other homogeneous thermoplastic films, it has been found desirable to incorporate a cooling period in the cycle of any continuous or semi-continuous apparatus used for such purpose in order to allow the seal to set and regain its strength after being brought to the sealing temperature. In general, sealing is carried out at temperatures substantially above the softening point of the thermoplastic material; and at such elevated temperatures, the thermoplastic material tends to stick to the source of heat, i. e., sealing bar. Hence, unless the seal is permitted to set at a lower temperature before the sealing bar or other source of heat is removed from the seal, sticking between the heat source and the thermoplastic material will tear, distort, pucker or thin out the heat seal. Polyethylene and rubber hydrochloride are typical examples of homogeneous thermoplastic film which stick to sealing bars and other sources of heat during heat-sealing operations.

An object of this invention is to provide a continuous or semi-continuous process and apparatus for heat-sealing various homogeneous thermoplastic films. Another object is to provide a continuous or semi-continuous process and apparatus for heat-sealing packages which have been wrapped with a homogeneous thermoplastic film. A further object is to provide a simple and highly efficient apparatus for heat-sealing homogeneous thermoplastic films, this apparatus being capable of being constructed with readily available basic parts. A still further object is to provide apparatus for heat-sealing packages wrapped in thermoplastic films, which apparatus is especially adapted for sealing packages of uneven shape and size which cannot be handled in automatic wrapping and sealing machines.

The above objects are accomplished according to the present invention by providing an apparatus comprising an endless belt of a material which has only a slight tendency to stick to a thermoplastic film at heat-seal temperatures and which can be stripped readily from the film at room temperature, said endless belt being positioned so as to pass over and in contact with, first, a hot plate heated to a temperature sufficiently high to heat-seal homogeneous thermoplastic film, and then a cold plate maintained at about room temperature or below. In a preferred embodiment, the endless belt is composed of a woven glass fabric which has been coated with an aqueous dispersion of polytetrafluoroethylene.

The invention will now be specifically described with reference to the accompanying drawing wherein:

Figure 1 is a top plan view of the heat-sealing apparatus of this invention; and Figure 2 is a section on line A—A' of Figure 1, additionally showing packages being sealed.

Referring to the drawing, a hot metal plate 1 and a cold metal plate 2 are so mounted in adjacent openings in a table 3 that the top surfaces of plates 1 and 2 are substantially flush with the upper surface of the table. The hot plate is provided with suitable heating means such as a resistance-type heating element 4, operative to heat and maintain the plate at a temperature substantially above the softening point of the film to be heat-sealed. The cold plate may be of hollow construction, as shown, with provision for the circulation of a coolant therethrough, or, it may be of solid or hollow construction and operated at room temperature. In general, the choice of operating temperatures for the cold plate, i. e., whether at room temperature or below, will be dictated by the rate at which the sealing is carried out and by the specific thermoplastic film being sealed. An endless belt 5 on upper rollers 6 and 7, and lower rollers 8 and 9, is arranged to move over and in contact with the top surfaces of the hot and cold plates, and lengthwise of the table, and thence beneath the table and plates. As indicated hereinabove, the endless belt is preferably composed of woven glass fabric coated on the upper side, at least, with polytetrafluoroethylene.

The apparatus just described operates as follows: An article P wrapped in a thermoplastic film such as polyethylene or rubber hydrochloride is placed on the edge of the table 3 with the unsealed portions of the package folded under. This package is then moved over roller 6 and pressed by hand or mechanical means into contact with the fabric belt 5. The package is then moved with or slid over the fabric belt until the package is in a position directly over the hot plate 1. The hot plate is maintained at a temperature at least greater than the softening point of the thermoplastic film, and, in most cases, it is at a temperature substantially above the softening point. At this point, the thermoplastic film softens and the underfolded edges of the film are sealed to the main body of the film wrapping. Furthermore, at the elevated temperatures required for heat-sealing, the thermoplastic film becomes loosely adhered to the coated fabric belt; and the sealed package moves cocurrently with the fabric belt to a position over a cold plate 2. The cold plate may be maintained either at room temperature, or it may be cooled to lower temperatures by circulating cold water through the plate. Under most circumstances, it is sufficient to maintain the plate at substantially room temperature, this being sufficient to conduct heat away from the heat seal and set the seal. As the sealed package is moved away from the cold plate and onto the edge of the table, the sealed film readily strips away from the fabric belt as the sealed package passes over roller 7. This completes the sealing cycle.

The following examples will serve to further illustrate the principles and operation of the process and apparatus of the present invention:

Example 1

A cellulose sponge (3" x 5" x 1") was wrapped in a sample of translucent polyethylene film (melting point, 104° C.) 0.001" in thickness, and the open folds of the wrapping were folded under the package. The apparatus described in the accompanying drawings, Figures 1 and 2, was employed to seal this package. The electrically heated hot plate (6" x 10" x 2") was maintained at a temperature of about 135° C. (the actual temperature on top of the belt was about 110° C.); this is about the minimum temperature for sealing polyethylene in this apparatus when the package is moved over the hot plate at a reasonably rapid rate (in this case, the package was over the hot plate for about 2–3 seconds); and the cold plate, a solid block of aluminum (6" x 10" x 1"), was at room temperature. The packaged sponge was slid by hand over the coated belt (a woven glass fabric coated with polytetrafluoroethylene); and, as the package was moved over the hot plate, the polyethylene melted and the underfolded flaps were heat-sealed to the main body of the film wrapping. As the polyethylene melted, it became sticky to the extent that it became lightly adhered to the coated belt. At this point, the package was moved by hand pressure in the direction of the cold plate; and, owing to the slight adherence between the polyethylene and the coated belt, the belt moved along with the sealed package. The package was permitted to remain over the hot plate for a duration of about 2–3 seconds. The package was then moved across the surface of the cold plate at approximately the same rate of speed, and the sealed film readily stripped from the coated belt as the package was moved over the end roller. The resulting heat seal was relatively smooth and the bond strength was excellent.

Example II

In a manner similar to Example I and under substantially the same conditions, a cardboard box was wrapped in a sheet of substantially transparent polyethylene film (modified with a wax) 0.001" in thickness; and the package was heat-sealed to give a seal of smooth appearance and excellent bond strength.

Example III

In a manner similar to Example I and under the same conditions, a cellulose sponge was wrapped in a sheet of untensilized rubber hydrochloride film, 0.001" in thickness; and a heat seal of excellent bond strength was obtained.

The apparatus for carrying out the process of this invention is relatively easy to install in a table or counter along which or on which various items are packaged in thermoplastic films. For example, such an apparatus cold be installed in a store where meats or other food products are directly packaged. Furthermore, the apparatus can be operated by hand, which is the method presently employed for wrapping meat in thermoplastic films. Since the shape and size of red meat cuts vary from package to package, no packaging machine has yet been designed for continuous wrapping of meat in thermoplastic film. The greatest advantage of the apparatus of the present invention is that it can be operated by hand at a relatively rapid rate for packaging red meat and like products of non-uniform size and configuration. On the other hand, the present apparatus may be operated continuously for packaging articles of substantially the same size and shape by employing a motor to drive the endless belt. In conjunction with this, it would be necessary to have a continuously moving belt or other obvious mechanism for applying a slight pressure on the top of the wrapped article in order to provide for close contact between the package and the heat source and between the package and the cooling source. Such a mechanism would replace the hand pressure applied when the apparatus is operated manually.

The hot plate may be fabricated from any suitable metal such as iron, aluminum, copper or various alloys. It is preferred to heat the hot plate by electricity because temperature control within very narrow limits is possible, but other means may be used. The cold plate may be fabricated from a solid block of a suitable metal such as iron, copper, aluminum or various alloys. Under most circumstances, particularly with intermittent hand operation, sufficient heat is conducted away from the heat seal by a cold plate maintained at room temperature so that it is not usually necessary to cool the cold plate below room temperature. However, it is within the scope of the present invention to cool the cold plate by various means such as circulating cold water.

The endless belt employed in conjunction with the present apparatus serves to prevent adhesion between the hot thermoplastic film and the hot plate. For example, in the case of cellophane film which is coated with an extremely thin layer of a thermoplastic moisture-proofing composition, a heat source, e. g., a heat-sealing bar, will not stick to the film at elevated heat-sealing temperatures. Hence, in the case of coated cellophane and similar films having heat-sealable coatings, it is not necessary to cool the heat seal in order to remove the heat seal from the heat-sealing source. However, with such homogeneous thermoplastic films, such as polyethylene, rubber hydrochloride, polyvinyl chloride, polyvinylidene chloride, vinyl chloride/vinyl acetate copolymers, polyethylene terephthalate, and nylon, i. e., polyhexamethylene adipamide, polycaproamide, etc., direct contact between the film and a metallic heat source must be avoided; and a barrier material in the form of a non-adherent coating on the heat source or in the form of a single sheet must be employed. In the apparatus and process of the present invention, an endless belt composed of a glass fabric coated with polytetrafluoroethylene is preferred. The glass fabric is employed because of its excellent resistance to heat; and polytetrafluoroethylene is employed not only because of its excellent resistance to heat, but also its resistance to sticking to objects at elevated temperatures. As mentioned hereinbefore, it is necessary to apply a slight amount of pressure upon the package to be sealed in order that a close contact is maintained between the package to be sealed and the intermediate belt so that the full effect of the heat source is utilized in forming a tight heat seal. By the same token, pressure applied to the package as it passes over the cold plate provides for rapid dissipation of heat from the heat seal. This pressure may be applied by hand or a mechanical device which moves concurrently with the endless belt. It is to be understood that a slight amount of adhesion between the thermoplastic film and the endless belt is desired when the apparatus is operated by hand in order that the belt can be moved by moving the sealed package in the direction of the cold plate, and thereafter the sealed package is hand stripped from the endless belt. Experience has shown that slight sticking to the polytetrafluoroethylene coating is always encountered at sealing temperatures which are above the softening point of the thermoplastic film, the degree of adhesion increasing with increasing heat-sealing temperatures. Furthermore, it has been found that the cooled heat seals are readily stripped from the polytetrafluoroethylene coated glass fabric under all heat-sealing temperatures between 100° C. up to 350° C.

The particular temperature at which the heat seals are made depends mainly upon the specific film being sealed, the thickness of the film, and the rate at which sealing is carried out. In all cases, the minimum heat-sealing temperature is in the neighborhood of the softening point of the film, depending upon the rate at which the package is moved across the hot plate. In some cases, the softening point is substantially identical to the melting point, for example, polyethylene softens and melts at about 104° C., while polyvinylidene chloride softens at about 138° C. and melts at about 149° C. When the film being sealed has a thickness of 0.001" or less, excellent heat seals may be at the softening temperature or at temperatures slightly above, i. e., 5° C. above, the softening temperature. On the other hand, when thicker film is used, higher temperatures are preferably employed; for example, polyethylene film 0.004" in thickness is preferably heat-sealed at a temperature in the neighborhood of 154° C. On the other hand, lower temperatures may be used if the package is held over the hot plate for a brief period rather than just moving the package across the heat source at a reasonably rapid rate. Another factor which affects the heat-sealing temperature and the length of time to which the package may be subjected to elevated temperatures is the contents of the package or the particular object being packaged. For example, meats should not be over-exposed to elevated temperatures; and this applies generally to various food items which may be spoiled by over-exposure to heat. Furthermore, in sealing various frozen foods which are packaged in cardboard containers, the heat-sealing temperature must be sufficiently high to overcome rapid heat losses caused by contact with packages containing items at sub-freezing temperatures. In general, it is manifest that the heat-sealing temperature and the duration of exposure thereto will be adjusted in accordance with the particular object or product being packaged.

In all cases, adhesion between the film and the belt to such a degree that the cooled seal will not readily strip from the belt must be avoided for successful operation. Various other fabrics which are substantially resistant to heat-sealing temperatures may also be coated with polytetrafluoroethylene to fabricate the endless belt. However, woven glass fabrics are preferred because they are available in thin sheets, and such sheets have the required strength. Furthermore, glass fabrics exhibit little or no changes in dimensions upon repeated exposure to elevated temperatures. It is important that the belt employed in the present apparatus be as thin as possible so that the thermal insulating effects be minimized, i. e., so that the temperature drop across the belt be as low as possible. In general, it is preferred to coat the fabric with polytetrafluoroethylene using an aqueous dispersion of the polymer. On the other hand, woven glass fabrics coated with silicone rubber compositions may also be used, these coated fabrics being commercially available.

In producing the desired heat-sealing temperature, it is necessary to heat the hot plate to a greater temperature because the endless belt, especially when the preferred polytetrafluoroethylene-coated glass fabric is used, acts as an insulator. For instance, in Example I, the plate temperature was 135° C., whereas the actual heat-sealing temperature was about 110° C. These temperature differentials will vary with the temperature of the hot plate and the type of belt.

The foregoing examples clearly illustrate that the present process is particularly applicable to heat-sealing polyethylene, rubber hydrochloride and polyethylene terephthalate films, including both translucent and transparent polyethylene. Furthermore, the present process is fully applicable to heat-sealing various types of other thermoplastic films such as polyvinyl chloride, polyvinyl acetate, vinyl chloride/vinyl acetate copolymer, polyethylene glycol terephthalate, polyvinylidene chloride, polyhexamethylene adipamide, polyhexamethylene sebacamide, polycaproamide and various other types of nylon films. It is to be understood, however, that the present process is practical with untensilized, i. e., not stretched or cold drawn in one or two directions, film or film which is only slightly tensilized. Tensilized film tends to shrink back to its original dimensions, and this usually results in film tearing when seals are made in accordance with this invention.

A particular advantage of the present invention is that it provides a simple and economical apparatus for heat-sealing prewrapped packages. Furthermore, the heat-sealing apparatus of the present invention may be operated by hand; and this is highly advantageous in packaging meat. A further advantage is that the present apparatus may be set up in a small space in any room or store where meat and/or other items are to be packaged and displayed. A still further advantage is that the present apparatus is unusually cheap to install and maintain in efficient working condition.

As many widely different embodiments may be made without departing from the spirit and scope of my invention, it is understood that said invention is in no way restricted except as set forth in the appended claims.

I claim:

1. Heat-sealing apparatus comprising in combination a table top having two adjacent aligned openings therein, a flat-topped heated plate located in one of said openings, a flat-topped cooled plate located in the other of said openings, the top surface of each of said plates being substantially flush with the top surface of said table top, and a movable endless belt adapted to support and carry thereon packages wrapped in thermoplastic, heat-sealable film and disposed to pass over and in contact with the upper surface of said table top and the top surface of each of said plates, and thence under said table top and said plates.

2. The apparatus of claim 1 wherein the belt is of woven glass fabric coated with polytetrafluoroethylene.

3. The apparatus of claim 1 comprising, in addition, stripping means disposed adjacent and beyond said cooling surface operative to strip film and packages from said belt.

References Cited in the file of this patent

UNITED STATES PATENTS

| | | |
|---|---|---|
| 2,099,700 | Mertis | Nov. 23, 1937 |
| 2,542,900 | Chaffee | Feb. 20, 1951 |
| 2,574,094 | Fener et al. | Nov. 6, 1951 |
| 2,591,383 | Spalding | Apr. 1, 1952 |

FOREIGN PATENTS

| | | |
|---|---|---|
| 549,803 | Great Britain | Dec. 8, 1942 |